United States Patent
Schick et al.

(10) Patent No.: US 7,150,143 B2
(45) Date of Patent: Dec. 19, 2006

(54) HYBRID FUEL CELL-PULSE DETONATION POWER SYSTEM

(75) Inventors: Louis Andrew Schick, Delmar, NY (US); Anthony John Dean, Scotia, NY (US)

(73) Assignee: General Electric Company, Niskayuna, NY (US)

( * ) Notice: Subject to any disclaimer, the term of this patent is extended or adjusted under 35 U.S.C. 154(b) by 596 days.

(21) Appl. No.: 10/624,114

(22) Filed: Jul. 21, 2003

(65) Prior Publication Data

US 2005/0019620 A1   Jan. 27, 2005

(51) Int. Cl.
- *F02C 3/20* (2006.01)
- *F02C 5/00* (2006.01)
- *F02C 6/00* (2006.01)
- *F02C 6/18* (2006.01)

(52) U.S. Cl. ............ 60/39.38; 60/39.76; 60/39.12; 60/39.182

(58) Field of Classification Search .......... 60/784, 60/39.12, 39.38, 39.76, 39.182
See application file for complete search history.

(56) References Cited

U.S. PATENT DOCUMENTS

| | | | |
|---|---|---|---|
| 5,955,039 A | 9/1999 | Dowdy | |
| 6,062,018 A * | 5/2000 | Bussing | 60/39.39 |
| 6,077,620 A * | 6/2000 | Pettit | 429/26 |
| 6,548,197 B1 | 4/2003 | Chandran et al. | |
| 2002/0174659 A1 | 11/2002 | Viteri et al. | |

FOREIGN PATENT DOCUMENTS

WO   WO 01/12755   * 2/2001

OTHER PUBLICATIONS

EP 0425 4290 European Search Report, Dec. 12, 2005.

* cited by examiner

*Primary Examiner*—Ted Kim
(74) *Attorney, Agent, or Firm*—Penny A. Clarke; Patrick K. Patnode

(57) ABSTRACT

A power system includes a fuel cell module adapted to receive a first fuel and a pulse detonation combustor adapted to receive and detonate a second fuel and exhaust a number of detonation products to create thrust for propulsion, mechanical work extraction or electrical power production.

33 Claims, 4 Drawing Sheets

HYBRID FUEL CELL-PULSE DETONATION POWER SYSTEM

BACKGROUND OF THE INVENTION

The invention relates generally to hybrid cycle power generation and, more particularly, to a hybrid fuel cell/pulse detonation engine power system.

Fuel cells, for example solid oxide fuel cells (SOFCs), are energy conversion devices that produce electricity by electrochemically combining a fuel and an oxidant across an ion conducting layer. For power generation applications, large numbers of fuel cells arranged in stacks are used to generate electric power.

One challenge facing fuel cell power generation is the long time scale to get to full load. Although the time constants vary by fuel cell type, they typically range from a few hours to days for powers of about a megawatt or more. In contrast, conventional one-hundred watt (100 MW) gas turbines go from cold start to full load in less than about five (5) minutes. Accordingly, it would be desirable to have a rapid start option for power systems that incorporate fuel cells.

Another challenge facing fuel cell power generation is building fuel cells that are large enough to utilize a substantial fraction of the fuel supplied to the fuel cell unit, so that competitive fuel efficiencies can be achieved. Large fuel cells can be expensive and difficult to fabricate. Accordingly, it would be desirable to achieve competitive fuel efficiencies while using smaller, less expensive fuel cells.

Another objective in power system design is increased efficiency, for both simple cycle and combined cycle systems. However, to achieve high cycle efficiencies, both the pressure ratio and the working temperature must be as high as materials and cooling technology permit. Presently, high-pressure ratios are achieved using complex high-pressure compressors and turbines, which help to compensate for the four to seven percent (4–7%) pressure loss results from conventional combustion processes. However, these systems involve numerous pieces of complex rotating machinery.

Recently, efforts have begun to explore the use of pulse detonation engines in aircraft engines. Beneficially, pulse detonation engines produce a pressure rise from a series of repeating detonations or supersonic combustion events. Accordingly, it would be desirable to develop a power system that uses pulse detonations to enhance cycle efficiency. It would also be desirable for the power system to have rapid start capability. In addition, it would be desirable for the power system to achieve competitive fuel efficiencies, while using smaller fuel cells.

SUMMARY OF THE INVENTION

Briefly, in accordance with one embodiment of the present invention, a power system includes a fuel cell module, which is adapted to receive a first fuel, and a pulse detonation combustor, which is adapted to receive and detonate a second fuel and exhaust a number of detonation products to create thrust for propulsion, mechanical work extraction or electrical power production.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
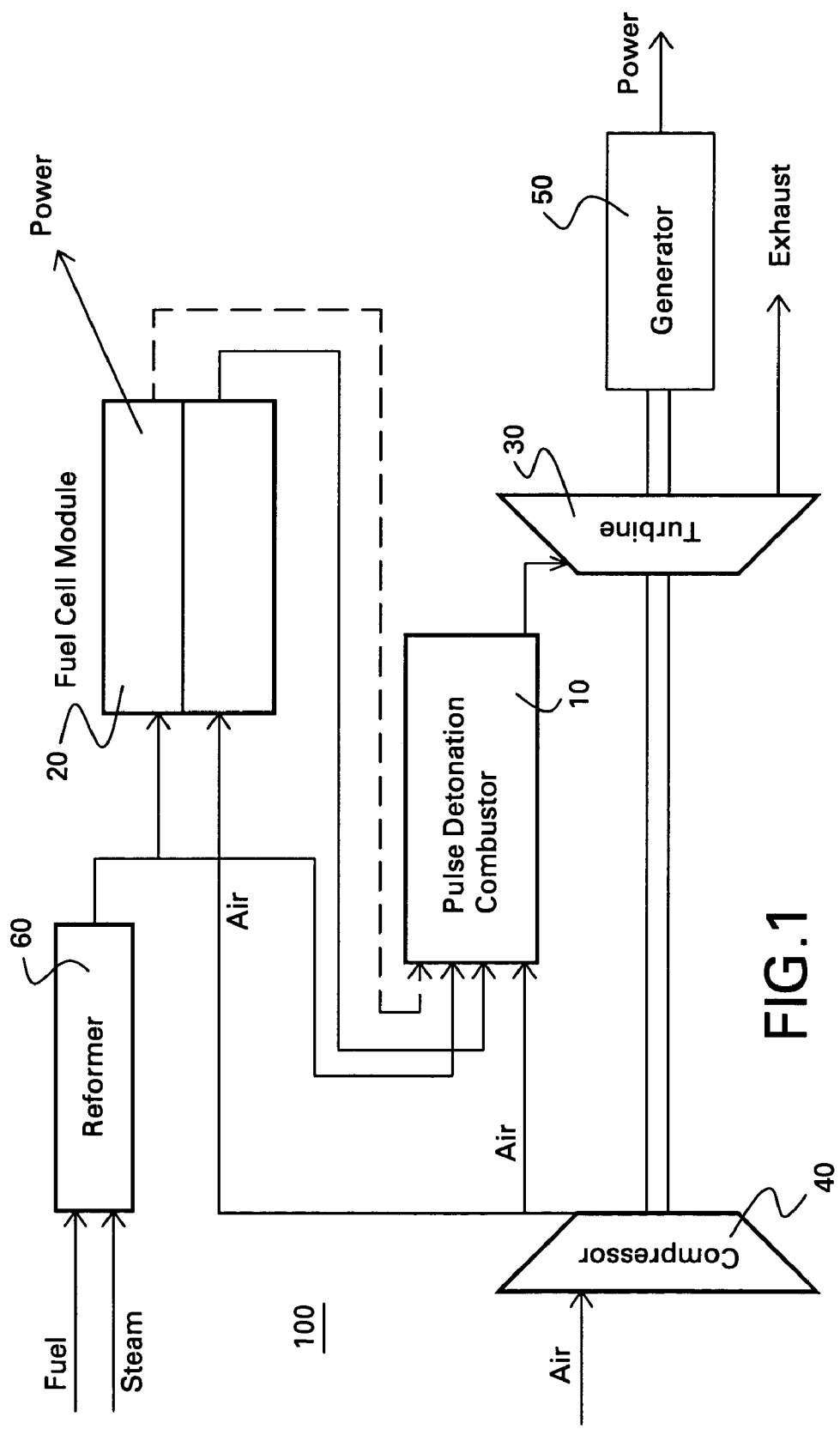
FIG. 1 illustrates a hybrid power system that incorporates a fuel cell module and a pulse detonation combustor driving a turbine/generator.

A power system 100 is described with reference to FIG. 1. As shown in FIG. 1, the power system 100 includes a fuel cell module 20 adapted to receive a first fuel, and a pulse detonation combustor 10 adapted to receive and detonate a second fuel and exhaust a number of detonation products to create thrust for propulsion, mechanical work extraction or electrical power production.

Figure 3:
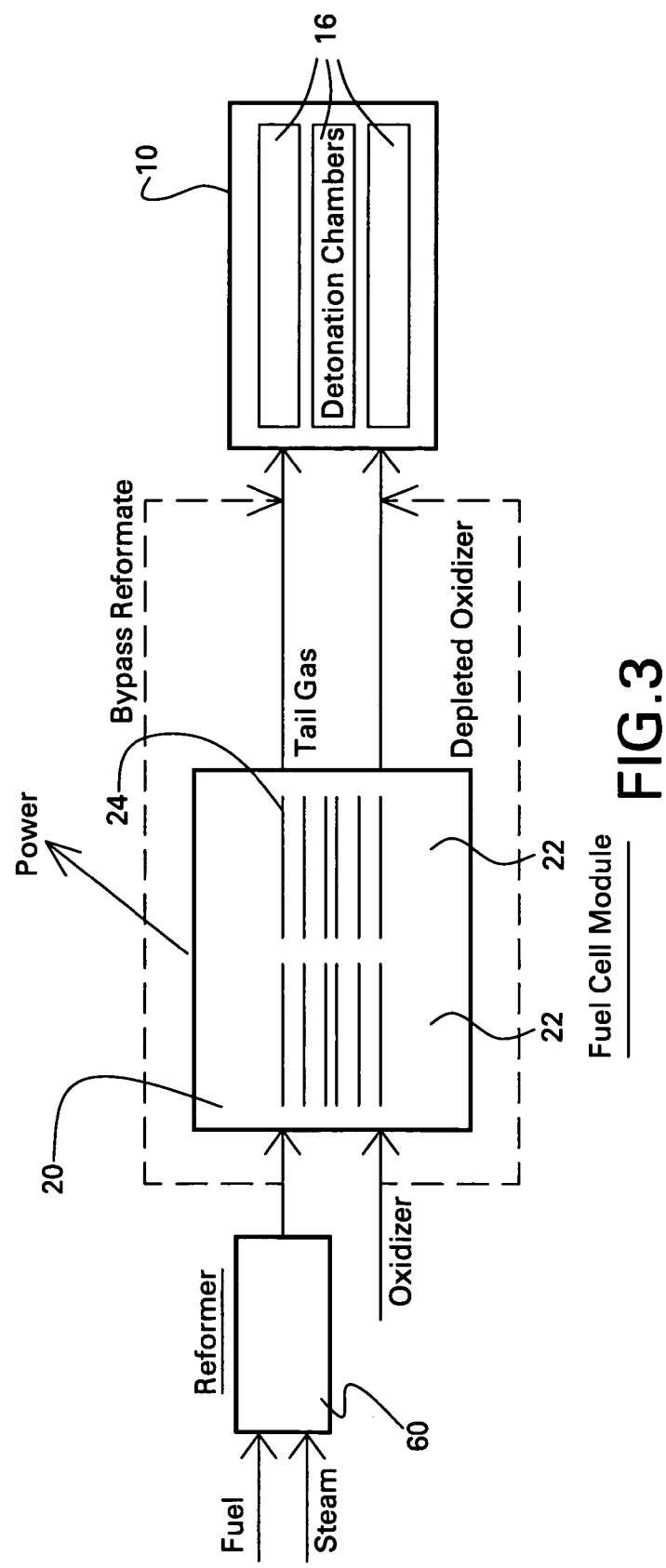
FIG. 3 shows the fuel cell module and the pulse detonation combustor of FIGS. 1 and 2.

Exemplary pulse detonation combustors 10 have a number of pulse detonation chambers 16, as indicated in FIG. 3, for example.

As used herein, a "pulse detonation combustor" is understood to mean any device or system that produces both a pressure rise and velocity increase from a series of repeating detonations or quasi-detonations within the device. A "quasi-detonation" is a supersonic turbulent combustion process that produces a pressure rise and velocity increase higher than the pressure rise and velocity increase produced by a deflagration (or constant-pressure combustion) wave. Typical embodiments of pulse detonation combustors include a means of igniting a fuel/oxidizer mixture, for example a fuel/air mixture, and a detonation chamber, in which pressure wave fronts initiated by the ignition process coalesce to produce a detonation wave. Each detonation or quasi-detonation is initiated either by external ignition, such as spark discharge or laser pulse, or by gas dynamic processes, such as shock focusing, autoignition or by another detonation (cross-fire). The geometry of the detonation chamber is such that the pressure rise of the detonation wave expels combustion products out the pulse detonation combustor exhaust to produce a thrust force. As known to those skilled in the art, pulse detonation may be accomplished in a number of types of detonation chambers, including detonation tubes, shock tubes, resonating detonation cavities and annular detonation chambers.

A primary objective in power system design is increased efficiency. High cycle efficiencies, however, require high-pressure ratios, which are conventionally achieved using complex high-pressure compressors and turbines, to help compensate for the four to seven percent (4–7%) pressure loss that results from conventional combustion processes. The bottoming cycle of the power system 100 described above achieves pressure rise combustion by performing repeat detonations, in contrast to conventional constant pressure combustion processes. Consequently, less energy is required by the compressor 40 to achieve the desired high pressures, for power system 100, as compared to a hybrid fuel cell power system with a conventional combustion bottoming cycle (not shown).

An exemplary fuel cell module 20 is described with respect to FIG. 3. As indicated, the exemplary fuel cell module 20 includes at least one fuel cell stack 22, which includes at least one fuel cell unit 24. Exemplary fuel cell units 24 comprise an anode (not shown), a cathode (not shown), and an electrolyte (not shown) disposed between the anode and cathode. The exemplary arrangement of two fuel cell stacks 22 shown in FIG. 3 is purely illustrative, and the number and arrangement of fuel cell stacks 22, as well as the number and arrangement of fuel cell units 24 within each stack 22 vary based on the requirements of the specific application, such as desired power output and spatial constraints. The exemplary fuel cell module 20 shown further includes an inlet 12, which is configured to receive the first fuel for supplying the fuel cell stacks 22, and an outlet 14, which is configured to exhaust an exhaust fuel flow from the fuel cell stacks 22.

As indicated in FIG. 3, for example, the fuel cell module 20 is further adapted to receive a first oxidizer, and the pulse detonation combustor 10 is further adapted to receive a second oxidizer. The terms "first oxidizer" and "second oxidizer" are used herein to indicate that the fuel cell module 20 and the pulse detonation combustor 10 may use different oxidizers. For example, exemplary fuel cell modules 20 and pulse detonation combustors 10 are adapted to receive compressed air and oxygen ($O_2$), respectively. However, typically both the first and second oxidizers comprise compressed air. In particular, the exemplary power system 100 depicted in FIG. 1 includes a compressor 40 configured to supply compressed air to at least one of the fuel cell module 20 and the pulse detonation combustor 10. For the particular embodiment shown, the compressor 40 is configured to supply compressed air to both the fuel cell module 20 and the pulse detonation combustor 10. In addition, to enhance detonation initiation, the pulse detonation combustor 10 may be further adapted to receive a supplemental oxidizer, for example $O_2$.

As noted above, expulsion of the combustion products from the pulse detonation combustor 10 produces a thrust force. The power system 100 further includes a turbine 30 that is driven by the thrust force and a generator 50 adapted to generate power. More particularly, the turbine 30 is positioned downstream from the pulse detonation combustor 10 and is in flow communication with the pulse detonation combustor 10. The generator 50 is connected to the turbine 30 to convert shaft power to electricity. The shaft power has, of course, many uses including driving pumps, fans, or propellers (for propulsion). All such uses are encompassed by the present invention.

Figure 2:
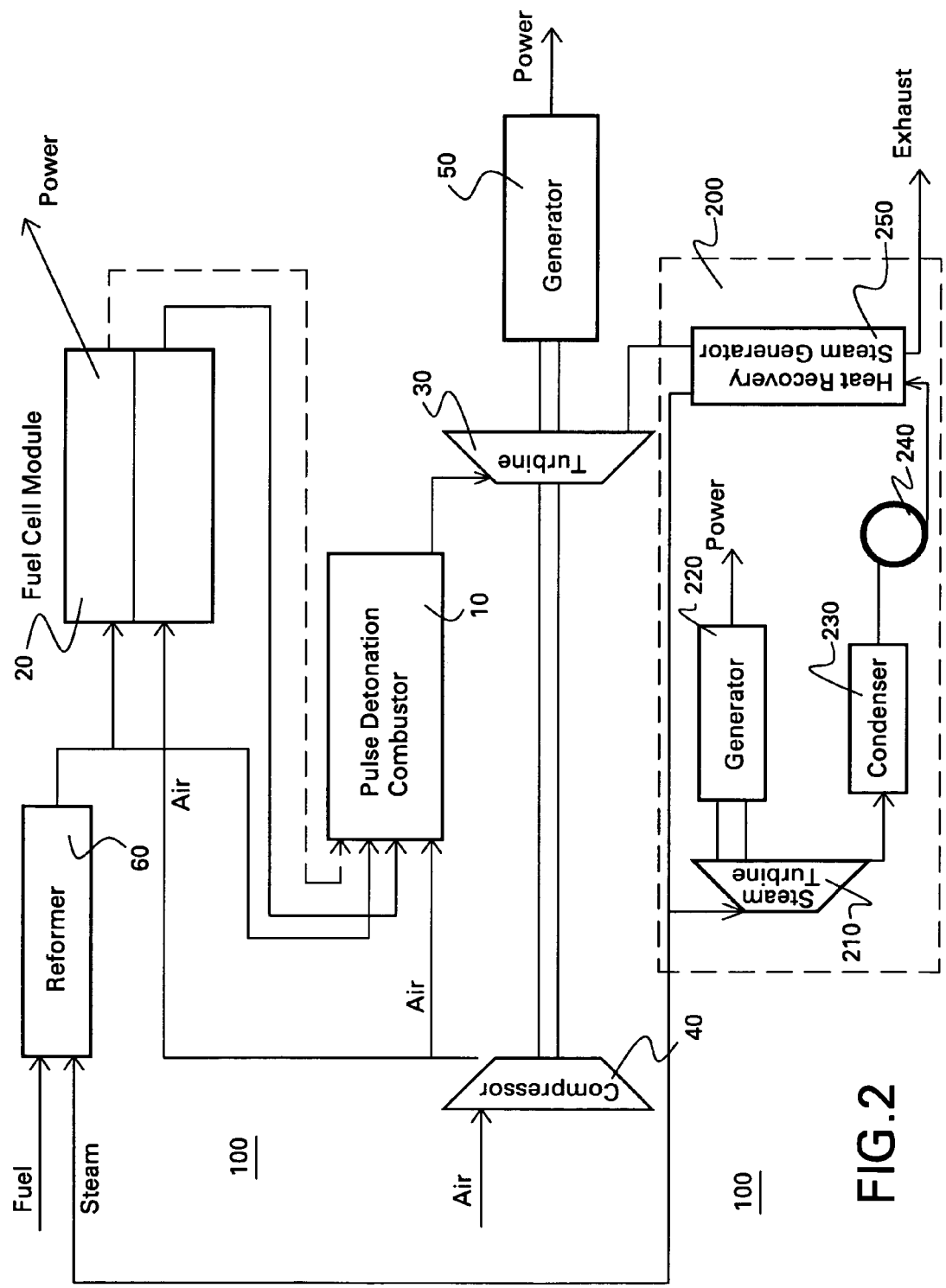
FIG. 2 illustrates another hybrid power system embodiment that incorporates a fuel cell module, a pulse detonation combustor driving a turbine/generator, and a Rankine bottom cycle.

FIG. 2 illustrates another embodiment of the combined cycle power system 100. As shown in FIG. 2, the power system 100 includes a Rankine bottom cycle (or steam turbine bottoming cycle). As shown, the steam turbine assembly 200 is adapted to receive an exhaust stream from the turbine 30, to generate steam using the exhaust stream, and to generate power using the steam. Beneficially, incorporation of the steam turbine assembly 200 extracts additional power from waste heat from the hybrid power system 100. For the particular embodiment shown in FIG. 2, the steam turbine assembly 200 includes a steam turbine 210 adapted to generate power using the steam. The steam turbine assembly 200 also includes a condenser 230, which is adapted to receive and condense an exhaust steam from the steam turbine 210 to supply a fluid stream, and a pump 240, which is adapted to receive and pump the fluid stream. In addition, the exemplary steam turbine assembly 200 includes a heat recovery steam generator 250 adapted to receive the exhaust stream from the turbine 30, to receive the fluid flow from the pump 240, and to generate steam from the fluid flow using the exhaust stream.

The fuel cell module 20 and pulse detonation combustor 10 may be adapted to use the same fuel, for example reformate or hydrogen ($H_2$), or to use different fuels, for example distillate fuel or natural gas. For the particular embodiment illustrated in FIG. 1, the power system 100 further includes a reformer 60 adapted to receive and reform a fuel and to generate a reformate. The reformate is supplied to the fuel cell module 20. More particularly, for the embodiment depicted in FIG. 1, the reformate is also supplied to the pulse detonation combustor 10. In addition, the pulse detonation combustor 10 may be further adapted to receive the tail gas from the fuel cell module 20, as indicated in FIG. 1 by a dashed line.

Figure 4:
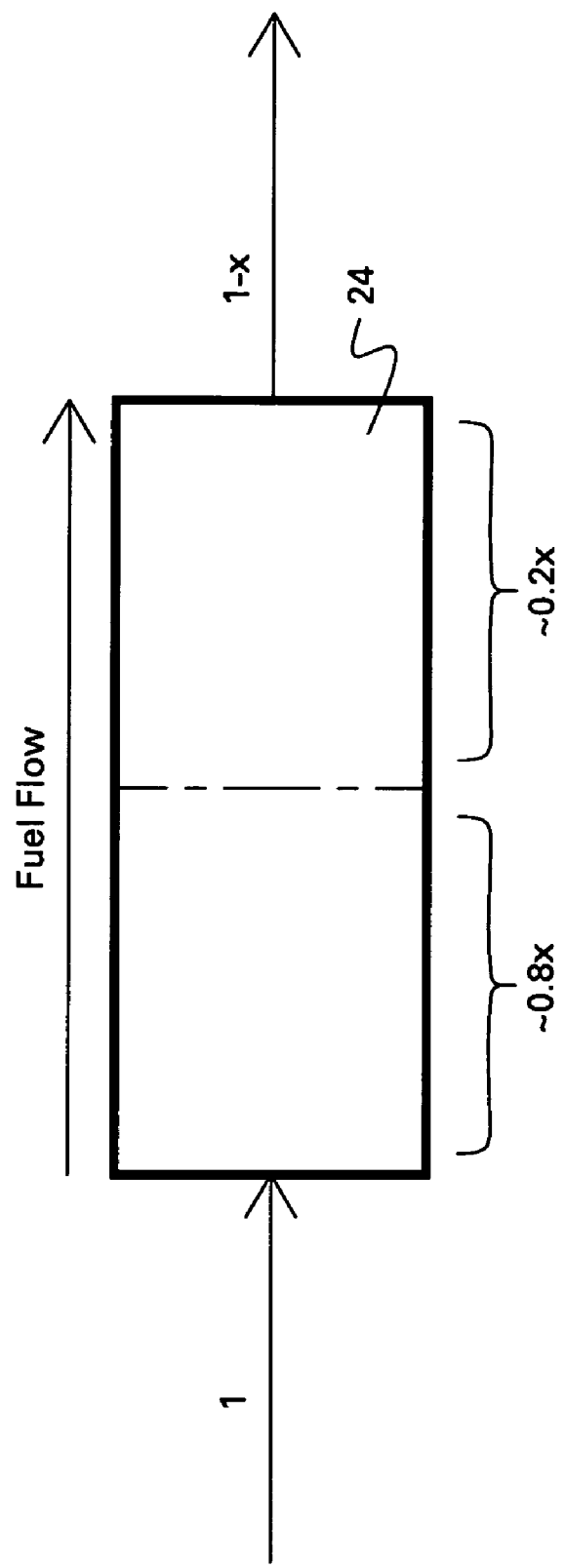
FIG. 4 illustrates an exemplary fuel utilization distribution across a fuel cell unit.

One of the more significant technical challenges facing fuel cell power generation is building fuel cells 24 that are large enough to utilize a substantial fraction of the fuel supplied to the fuel cell unit, so that competitive fuel efficiencies can be achieved. Roughly, to achieve an efficiency of about sixty five percent (65%), about eighty percent (80%) of the fuel must be used. Similarly, efficiencies of about seventy percent (70%), require fuel utilization of about eighty five percent (85%). However, achieving such high fuel utilizations in fuel cell units 24 can be cost prohibitive because of the nature of fuel utilization within a fuel cell unit. As illustrated in FIG. 4, approximately eighty percent (80%) of the fuel that is utilized by a fuel cell unit (indicated in FIG. 4 as "x") occurs in the first half of the fuel cell unit. Accordingly, adapting the pulse detonation combustor 10 to receive the tail gas from the fuel cell module 20, facilitates reducing the size of the fuel cell unit 24 (such that the fuel utilization for the unit "x" is less), while still achieving the desired fuel utilization (and hence efficiency), for example an overall fuel utilization for the hybrid fuel cell/PDE system in excess of ninety-nine percent (99%).

As used here, the term "reformer" refers to an apparatus for generating Hydrogen by the reaction of steam and a reformable fuel. Exemplary reformable fuels include hydrocarbons, for example natural gas or distillate liquid fuels. Exemplary reformers 60 include catalytic reformers 60. In reforming steam and hydrocarbon fuel mixtures, such reformers are typically operated in a temperature range of about 800 degrees Farenheit (800° F.) to about fourteen hundred degrees Farenheit (1400° F.), depending on the fuel and catalyst. The reformer reacts the steam and fuel mixture to generate Hydrogen having quantities of water, methane, carbon dioxide, carbon monoxide and various trace materials entrained (collectively termed "reformate.") Although only one reformer 60 is depicted in FIG. 1, it should be understood that two or more reformers 60 having like or different catalysts may be employed to more efficiently generate Hydrogen.

For a particular embodiment of power system 100, the pulse detonation combustor 10 is adapted to operate in a stand-alone mode, and the reformer 60 is adapted to supply the reformate to the pulse detonation combustor 10 for operation in the stand-alone mode. By "stand-alone," it is meant that the identified module, here the pulse detonation combustor 10, operates while the other module, here the fuel cell module 20, does not generate power. For example, the pulse detonation combustor 10 is adapted to operate in a stand-alone mode, while the fuel cell module 20 is in a warm-up mode, for an exemplary embodiment. Large fuel cell units 24, suitable for use in power generation, have slow time constants and are slow to get up to full load, on the order of hours to days, depending on the type of fuel cell and load. These long delays are undesirable for power generation applications. Accordingly, it is desirable for the pulse detonation combustor 10 to be independently operable, so that power can be generated while the fuel cell module 20 warms up or is off-line for other reasons, such as maintenance. Similarly, it is also desirable for the fuel cell module 20 to be operable in a stand-alone mode, so that power generation continues while the pulse detonation combustor 10 is off-line, for example for maintenance.

In addition, it is desirable to size the pulse detonation combustor 10 and turbine 30 larger than that required for nominal, steady operation of the power system 100, in order to increase the transient response of the power system 100. This latter oversized embodiment provides compensation for fuel cell life degradation. Namely, because the pulse detonation combustor 10 and turbine 30 are oversized, they can be run with higher outputs when the fuel cell units 24 degrade. In addition, for peaking operation, more power can be generated with minor loss in overall efficiency by running the pulse detonation combustor 10 and turbine 30 at full output.

Although only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A power system comprising:
a fuel cell module adapted to receive a first fuel;
a pulse detonation combustor adapted to receive and detonate a second fuel and exhaust a plurality of detonation products; and
a reformer adapted to receive and reform a fuel and to generate a reformate,
wherein the first fuel comprises the reformate, wherein said fuel cell module is further adapted to receive a first oxidizer, and wherein said pulse detonation combustor is further adapted to receive a second oxidizer,
wherein said pulse detonation combustor is adapted to operate in a stand-alone mode, and
wherein said reformer is adapted to supply the reformate to said pulse detonation combustor for operation in the stand-alone mode, and wherein said pulse detonation combustor is adapted to operate in a stand-alone mode while said fuel cell module is in a warm-up mode.

2. The power system of claim 1, wherein the first and second fuels are different fuels.

3. The power system of claim 1, wherein the first and second fuels are the same fuel.

4. The power system of claim 1, wherein the second fuel comprises the first fuel plus a tail gas from said fuel cell module.

5. The power system of claim 1, further comprising a compressor configured to supply compressed air to at least one of said fuel cell module and said pulse detonation combustor.

6. The power system of claim 5, wherein said pulse detonation combustor comprises a plurality of detonation chambers.

7. The power system of claim 5, wherein both the first and the second oxidizers comprise compressed air.

8. The power system of claim 7, wherein said pulse detonation combustor is further adapted to receive a supplemental oxidizer.

9. The power system of claim 8, wherein the supplemental oxidizer comprises oxygen ($O_2$).

10. The power system of claim 7, wherein said fuel cell module comprises at least one fuel cell stack comprising at least one fuel cell unit.

11. The power system of claim 1, further comprising a turbine positioned downstream from said pulse detonation combustor, said turbine being in flow communication with said pulse detonation combustor.

12. The power system of claim 11, further comprising a generator connected to said turbine, said generator being adapted to generate electricity.

13. The power system of claim 12, further comprising a steam turbine assembly adapted to receive an exhaust stream from said turbine, to generate steam using the exhaust stream, and to generate power using the steam.

14. The power system of claim 13, wherein said steam turbine assembly comprises:
a steam turbine adapted to generate power using the steam;
a condensor adapted to receive and condense an exhaust steam from said steam turbine to supply a fluid stream; and
a pump adapted to receive and pump the fluid stream.

15. The power system of claim 14, wherein said steam turbine assembly further comprises a heat recovery steam generator adapted to receive the exhaust stream from said turbine, to receive the fluid flow from said pump, and to generate steam from the fluid flow using the exhaust stream.

16. The power system of claim 1, wherein the second fuel also comprises the reformate.

17. The power system of claim 16, wherein the second fuel further comprises a tail gas from said fuel cell module.

18. A power system comprising:
a fuel cell module adapted to receive a first fuel; and
a pulse detonation combustor adapted to receive and detonate a second fuel and exhaust a plurality of detonation products, wherein said pulse detonation combustor is adapted to operate in a stand-alone mode, and wherein said pulse detonation combustor is adapted to operate in a stand-alone mode while said fuel cell module is in a warm-up mode.

19. The power system of claim 18, wherein said fuel cell module is adapted to operate in a stand-alone mode.

20. A power system comprising:
a fuel cell module adapted to receive a first fuel;
a pulse detonation combustor adapted to receive and detonate a second fuel and exhaust a plurality of detonation products;
a turbine positioned downstream from said pulse detonation combustor, said turbine being in flow communication with said pulse detonation combustor; and
a compressor configured to supply compressed air to at least one of said fuel cell module and said pulse detonation combustor, wherein said pulse detonation combustor is adapted to operate in a stand-alone mode while said fuel cell module is in a warm-up mode.

21. The power system of claim 20, further comprising a generator connected to said turbine and adapted to generate electricity.

22. The power system of claim 20, wherein said pulse detonation combustor comprises a plurality of pulse detonation chambers.

23. The power system of claim 20, wherein the first and second fuels are different fuels.

24. The power system of claim 20, wherein the first and second fuels are the same fuel.

25. The power system of claim 20, wherein said fuel cell module comprises at least one fuel cell stack comprising a plurality of fuel cell units.

26. The power system of claim 20, wherein said pulse detonation combustor is adapted to operate in a stand-alone mode.

27. The power system of claim 20, further comprising a reformer adapted to receive and reform a fuel and to generate a reformate, wherein the first fuel comprises the reformate.

28. The power system of claim 27, wherein the second fuel comprises the reformate.

29. The power system of claim 28, wherein the second fuel further comprises a tail gas from said fuel cell module.

30. The power system of claim 27, wherein said pulse detonation combustor is adapted to operate in a stand-alone mode, and wherein said reformer is adapted to supply the reformate to said pulse detonation combustor for operation in the stand-alone mode.

31. The power system of claim 27, further comprising a steam turbine assembly adapted to receive an exhaust stream from said turbine, to generate steam using the exhaust stream, and to generate power using the steam.

32. The power system of claim 31, wherein said steam turbine assembly comprises:

a steam turbine adapted to generate power using the steam;

a condensor adapted to receive and condense an exhaust steam from said steam turbine to supply a fluid stream;

a pump adapted to receive and pump the fluid stream; and a heat recovery steam generator adapted to receive the exhaust stream from said turbine, to receive the fluid flow from said pump, and to generate steam from the fluid flow using the exhaust stream.

33. The power system of claim 20, wherein said pulse detonation combustor and said turbine are sized larger than is required for a nominal, steady operation of said power system.

* * * * *